Oct. 13, 1964

E. H. EVANS ETAL 3,152,841

CONVEYING APPARATUS

Filed March 19, 1962

3 Sheets-Sheet 1

INVENTORS
ELMER H. EVANS
FRANK C. STARBUCK
BY

Oct. 13, 1964   E. H. EVANS ETAL   3,152,841
CONVEYING APPARATUS
Filed March 19, 1962   3 Sheets-Sheet 2

INVENTORS
ELMER H. EVANS
FRANK C. STARBUCK
BY

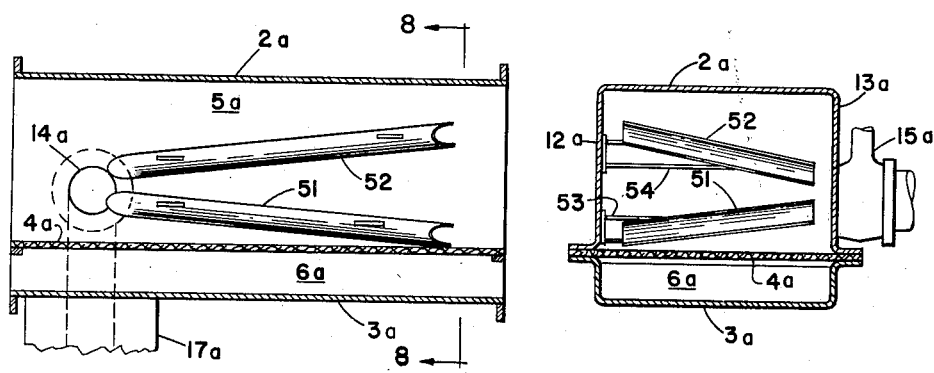
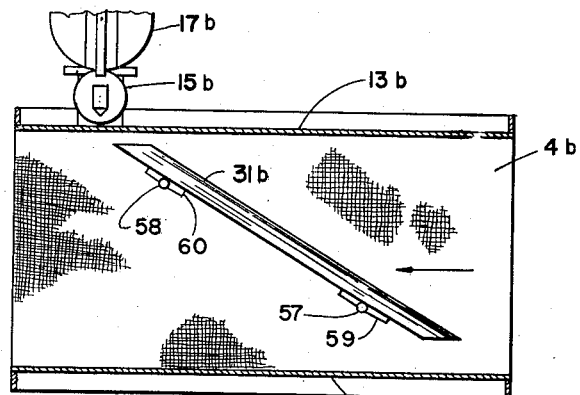
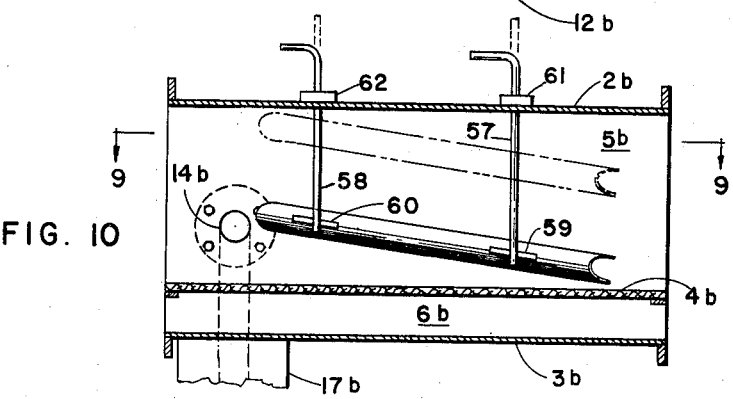

United States Patent Office 3,152,841
Patented Oct. 13, 1964

3,152,841
CONVEYING APPARATUS
Elmer H. Evans, Alpena, and Frank C. Starbuck, Detroit, Mich., assignors to Huron Portland Cement Company, Detroit, Mich., a corporation of Michigan
Filed Mar. 19, 1962, Ser. No. 180,886
4 Claims. (Cl. 302—29)

The present invention relates to the handling of material in conveyors, and is concerned more particularly with the representative sampling of loose solids, and in fluidizing gravity conveyors in particular.

Considerable difficulty has been encountered in obtaining reliable, accurately representative samples of materials while they are in motion in conveyors. This problem is particularly acute in fluidizing gravity conveyors because of their characteristically high flow rates.

Prior samplers have used mechanical devices which either rotate, oscillate, or reciprocate within the material, often in an attempt to draw and collect material from several points or from the entire cross-sectional area of the stream. However, no sampler has proven to be entirely reliable or satisfactory.

In general, the preferred form of the present invention comprises a casing having an inlet and an outlet and a material-conveying duct defining a path of material flow. The duct has means for maintaining the material flow, preferably an aerating gas-permeable deck, and has a sampling port in one wall thereof. A sluice or plow is positioned in the duct at an angle to the direction of material flow. The downstream end of the plow is adjacent the sampling port, and the opposite end extends therefrom transversely of the duct and upstream toward the duct inlet. The plow includes a longitudinal depression or channel which is positioned facing upstream toward the inlet to receive flowing material directly into itself along its length, and is aligned so that its longitudinal axis is directed toward the sampling port.

When desired, a valve or other means may be provided in conjunction with the sampling port to provide for intermittent withdrawal of samples such as to a sample bucket or can.

Figure 1:
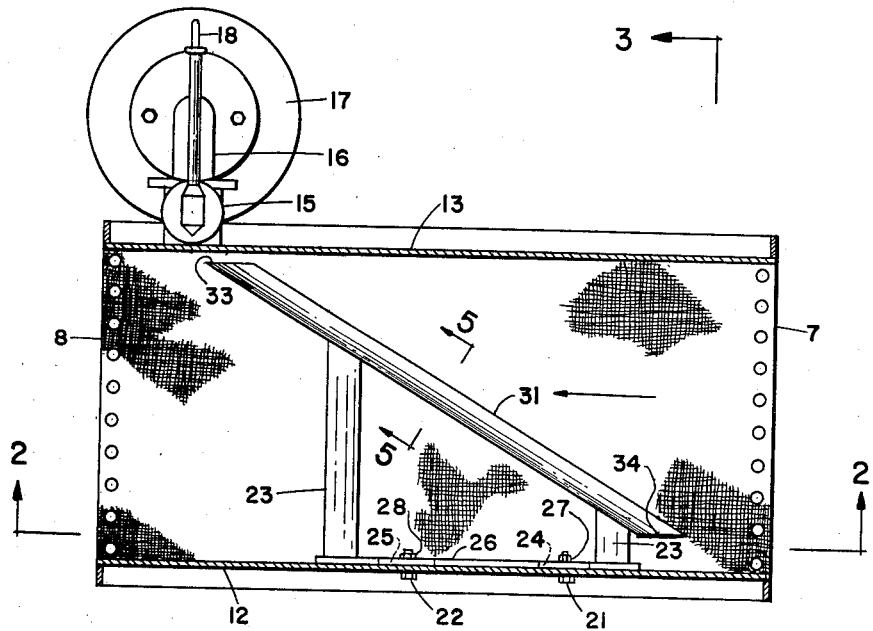
Figure 2:
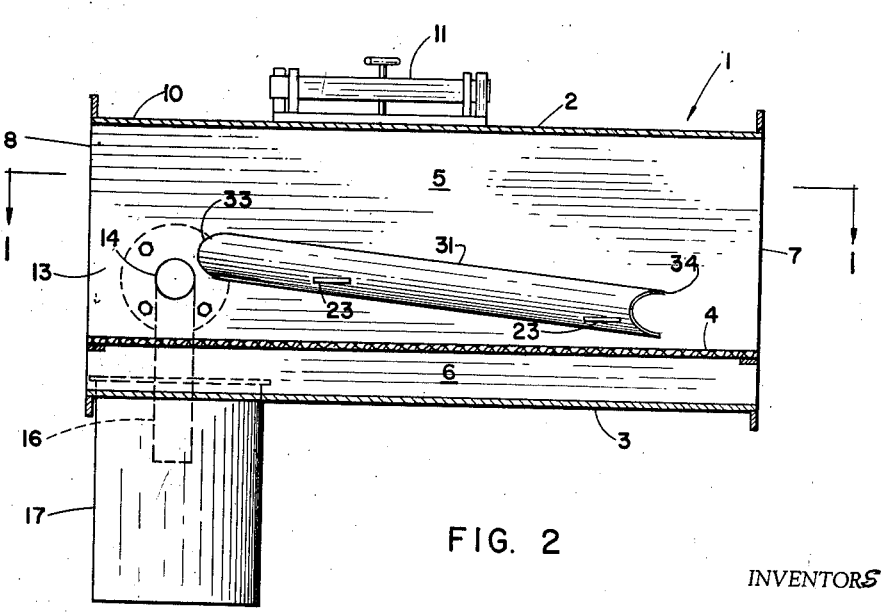
Figure 3:
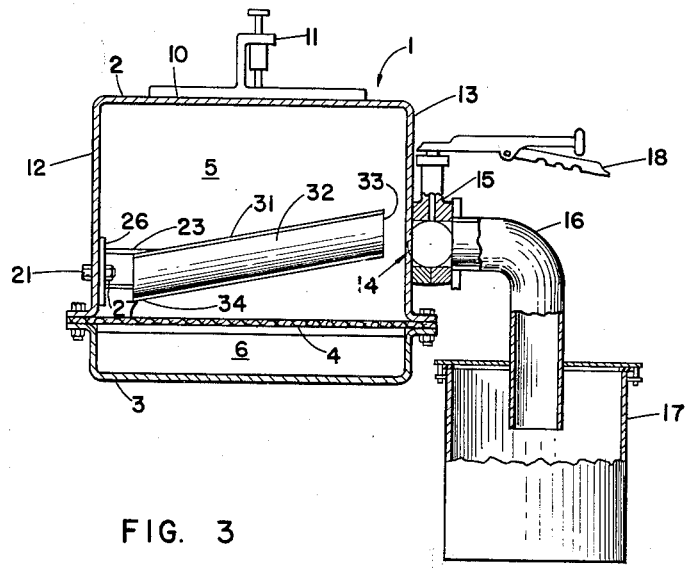
Figure 4:
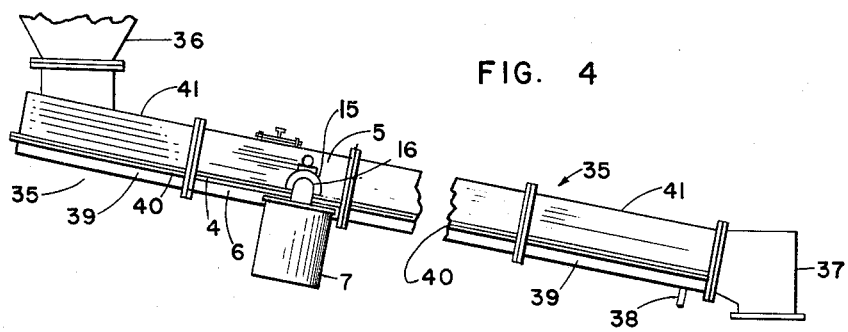
Figures 5, 6:
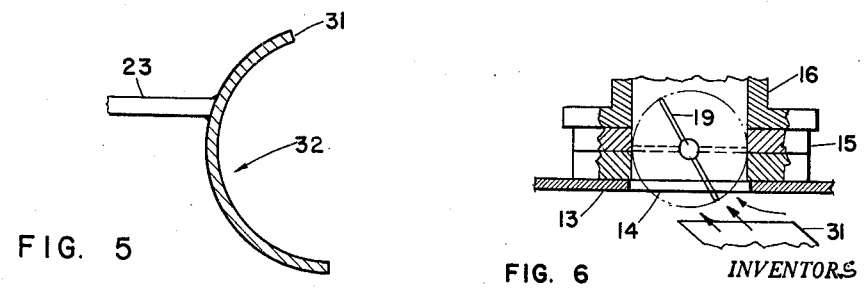

A better understanding of the invention may be derived from the following description and accompanying drawings in which:

FIG. 1 is a plan view, in section, of a fluidizing gravity conveyor section embodying the invention;
FIG. 2 is a side view taken on section lines 2—2 of FIG. 1;
FIG. 3 is a cross-section taken on lines 3—3 of FIG. 1;
FIG. 4 is a side view of the sampler of FIG. 1 as installed in a point-to-point fluidizing conveyor;
FIG. 5 is a cross-sectional view, on an enlarged scale taken on lines 5—5 of FIG. 1;
FIG. 6 is an enlargement, partly cut away, of the valve region of FIG. 1;
FIG. 7 is a view similar to FIG. 1 of a modified embodiment of the invention;
FIG. 8 is a sectional view taken on lines 8—8 of FIG. 7;
FIG. 9 is a view similar to FIG. 1 of a further modification of the invention, and
FIG. 10 is a sectional view on lines 10—10 of FIG. 9.

As shown in FIGS. 1-6, the preferred form of the invention is embodied in a fluidizing gravity conveyor of the type set forth in U.S. Patent No. 2,527,455 to H. R. Schemm. The sample section of the conveyor comprises a casing 1 having an upper inverted channel 2 and an underlying lower channel 3 which are bolted to each other at their edges with a gas-permeable deck 4 clamped therebetween. Preferably, the gas-permeable deck is a flexible fabric of uniform low gas permeability of the type disclosed in the aforementioned patent to Schemm. With the gas-permeable deck 4, the upper and lower channels 2 and 3 respectively form an upper material conveying duct 5 and an underlying air duct or plenum chamber 6.

The material-conveying duct 5 receives material at its upper or inlet end 7. The air duct 6 receives a supply of air or other gas either directly from a source of air under pressure or through its open end from an adjacent fluidizing conveyor section, or any aerating zone such as the fluidized outlet of a bin with which the sampler is associated. The air or other gas passes from the underlying air duct or plenum chamber upwardly through the gas-permeable deck to fluidize pulverulent material thereon and to cause it to flow through the material-conveying duct towards the discharge end 8 thereof.

The channel 2 forming the material-conveying duct 5 comprises a top wall 11 and a pair of side walls 12 and 13. The side wall 13 has a sampling port 14 therein which communicates via a valve 15 and a pipe 16 with a sample bucket 17 or any suitable receiving means. Various forms or shapes of sampling ports may be substituted.

The valve 15 is shown as the preferred butterfly design, although other types may be used. Preferably, the valve should be self-locking, as by the latch lever 18, and should be located as close as possible to the sampling port 14 to minimize material accumulation when the valve is closed. Also, the valve, when in open position, preferably is arranged to have its blade 19 in a scooping position with respect to the general direction of material flow through the duct 5, and with its surface generally aligned with the material flow from a transversely-extending collecting plow, to be described. This position is shown in FIG. 6.

The side wall 12 has threaded studs or bolts 21 and 22 protruding into the material-conveying duct 5. The bolts 21 and 22 engage a plow support or frame 23 through slots 24 and 25 in a base plate 26 thereof, and receive threaded nuts 27 and 28 which clamp the base plate 26 of the frame against the side wall 12.

The plow frame 23 carries a sluice or rounded, U-shaped plow 31 having a longitudinal channel 32, at the inside of the U, which faces the on-flowing material. The plow 31 is welded to the frame 23 and is positioned at an angle to the direction of the material flow in the duct 5. Preferably, the upstream end 33 of the plow is spaced along the casing length from the downstream end 34 a distance at least one and one-half times the width of the material duct 5, so that the plow forms an acute angle of less than 45 degrees with the walls 12 and 13, and therefore slices relatively sharply into the material stream.

The downstream end 34 of the plow is positioned adjacent the sampling port 14, and the channel 32 is generally aligned along its length with the sampling port. The downstream end 34 preferably is raised from the deck 4 a greater distance than the upstream end 33. The discharge end of the plow 31 and the sampling port 14 are at the same general elevation. The width of the plow, from top edge to bottom edge, will effect the rate of, or amount of discharge per unit of time. The total plow area presented to the material stream should be limited to a minor portion of the cross section of the material-flow area.

As shown in FIG. 4, the sampler is installed in a fluidizing conveyor 35 of the type disclosed in the aforementioned patent to H. R. Schemm. The conveyor 35 receives material from a hopper 36 for transport to a remote point at its discharge end 37, and is activated by gas or air supplied to the plenum chamber 6 through an air inlet 38. The air is supplied, by means of the open communication between the conveyor air-duct 39 and the sampler air duct 6, for passage through the respective gas-permeable decks 40 and 4 to fluidize material in their respective material-conveying ducts 41 and 5.

In operation of the apparatus of FIGS. 1–6, the gas or air supplied to the plenum chamber of conveyor 35 passes upwardly through the gas-permeable deck 4 and fluidizes material received thereon from the hopper 36, so that the material flows downwardly along the gas-permeable deck 4 to the discharge end 37 under the influence of gravity.

As the material flows downwardly through the conveying duct 5, the channel 32 of the plow 31 wedges or sweeps a "cut" of the flowing material toward and into the sampling port 14, much like a snow plow wedges a continuous cut of snow to one side of the road. Opening of the valve 15, for a short interval, causes a full charge of material to be delivered from the sampling port 14 through the pipe 16 to the sampling bucket 17, or the opened interval of the valve may be adjusted to suit any desired circumstance or location. In some cases, continuous samples will be preferred. In such cases, the valve 15 may be maintained in an open position until used as a shutoff for repairs, or may be omitted from the circuit, as desired.

The alignment of the material flow along the plow channel 32 with the sampling port 14 may be adjusted by shifting the slotted base 26 of the plow frame 23 longitudinally of the conveyor 35. Once the position is set, it is unlikely that any re-positioning will be necessary, unless other changes are to be made in the installation. The door 11' is used for access to the plow frame and the clamping nuts 27 and 28.

Since the plow 31 extends across substantially the full width of the material flow through the conveyor 35 and is raised at one end to cross diagonally of the depth of the material, it receives a sample which is satisfactorily representative of the material stream throughout its width and depth. Also, the increased space between the raised end of the plow 31 and the gas-permeable deck allows stray objects or lumps of material to pass beneath the plow and beyond the sampling area. An accumulation of objects or lumps would seriously interfere with the sampling effectiveness of the unit.

Because of the acute angle of the plow 31 with respect to the sidewalls 12 and 13, it presents a sharp wedge surface to the flowing material. This wedge effect allows the material to maintain a high velocity as it travels along the channel 32 of the plow, and provides for a forceful transfer of material from the plow 31 to the sampling port 14, regardless of interference from material flowing along the sidewall 13 near the port 14.

FIGS. 7 and 8 show a modified embodiment of the invention in which similar numerals, suffixed "a" are used to denote elements similar to those of FIGS. 1–5. Referring to these figures, a pair of plows 51 and 52 each preferably smaller than the single plow of FIG. 1, are mounted on the sidewall 12a by their respective plow frames 53 and 54, and converge upon the sampling port 14a at their downstream ends. At their upstream ends, the plows are spaced a greater distance from each other, with the end of the plow 51 lying close to the gas-permeable deck 4a, and the end of the plow 52 lying even with, or close to the upper level of the material stream moving through the chamber 5a.

If desired, a greater number of plows may be used. Also, the casing may be provided with a separate sampling port, in addition to the port 14a, for receiving material from the plow 52. The two streams then may be combined outside of the casing.

The operation of the apparatus of FIGS. 7 and 8 is very similar to that of the unit of FIG. 1. However, the two smaller plows 51 and 52 draw material from a more distributed cross-sectional area of the material stream than does the single plow of FIGS. 1 to 6, and are preferred in cases involving materials which tend to stratify or separate vertically according to particle size or density, or for any reason.

FIGS. 9 and 10 show an embodiment of the invention in which the same numerals, suffixed "b" are used for elements similar to those of FIG. 1. The plow 31b of these figures is positioned depthwise of the stream of material flowing through the conveyor by a pair of rods 57 and 58 which are welded, respectively, to clips 59 and 60 on the plow and are passed through the top wall 2b and fittings 61 and 62, which are adapted to hold the rods in vertical position and to seal against the escape of air or material upwardly along the rods. If desired, the rod-mounting of the plow may be replaced by a suitable hinge-mount. When sampling of material flowing through the conveying duct 5a is not desired, the plow is raised, by means of the rods 57 and 58, to the top position shown in dotted lines in FIG. 10.

In operation of the apparatus of FIGS. 9 and 10, a sample is taken by lowering the plow 31b to the aligned position shown in solid lines on FIG. 10, and opening the valve 15b for a period sufficient to collect the desired amount of sample. After the sample has been taken, the plow 31b may be kept in the lowered position, if desired, but generally will be raised to reduce or avoid obstruction of the material stream and to ensure passage of any oversize matter or lumps.

The sampler of FIGS. 9 and 10 is particularly advantageous for services in which samples are required only infrequently, and the material to be handled has a tendency toward agglomeration or balling into large lumps or balls, as is the case with many baker's flours.

Although the several plows have been shown rounded in cross section, it is to be understood that other suitable forms, such as squared channel-iron, may be substituted.

Various changes may be made in the details of the invention as described without sacrificing the advantages thereof or departing from the scope of the appended claims.

We claim:

1. In a conveyor for transporting fluidizable solids comprising a casing forming a longitudinal conveying compartment and having a material inlet adjacent one end and a gas-material outlet adjacent the other end, means for feeding fluidizable material to the material inlet to flow through said longitudinal compartment to the gas-material outlet, the conveying compartment having a gas-permeable lower wall and means for passing a gas through said gas-permeable wall to fluidize material in the conveying compartment, means for taking a sample of material flowing through said longitudinal conveying compartment including a plow extending transversely of the conveying compartment and partially longitudinally thereof, said plow having a height substantially less than the height of the conveying compartment so that it will intercept only a portion of a stream of material flowing through said conveying compartment, the plow being concave in the direction of flow of material from said inlet towards said outlet, a wall of the casing having a sampling port, the plow being so positioned in said conveying compartment that material intercepted by it is directed towards said sampling port for discharge therethrough.

2. A conveyor for transporting fluidizable solids as set forth in claim 1 in which said plow is U-shape.

3. A conveyor for transporting fluidizable solids as set forth in claim 1 in which said plow is spaced from said gas-permeable lower wall and in which the end of the plow adjacent the sampling port is spaced from the gas-permeable deck a greater distance than is its opposite end.

4. A conveyor for transporting fluidisable solids as set forth in claim 1 including a plurality of plows, each positioned to direct material towards said sampling port from different vertical portions of material flowing through said conveying compartment, whereby a more representative sample of material flowing through said compartment is obtained.

References Cited in the file of this patent
UNITED STATES PATENTS

| | | |
|---|---|---|
| 1,889,299 | Stein | Nov. 29, 1932 |
| 2,527,394 | Browne | Oct. 24, 1950 |